XR 2,921,253

Jan. 12, 1960 W. LIBEN 2,921,253

MAGNETIC DEVICES

Filed Jan. 31, 1956 2 Sheets-Sheet 1

*INVENTOR.*
WILLIAM LIBEN

*BY* Robert Hockfield

HIS ATTORNEY

INVENTOR.
WILLIAM LIBEN
BY Robert Hockfield
HIS ATTORNEY.

United States Patent Office 2,921,253

Patented Jan. 12, 1960

2,921,253

MAGNETIC DEVICES

William Liben, Houston, Tex., assignor, by mesne assignments, to Schlumberger Well Surveying Corporation, Houston, Tex., a corporation of Texas Application January 31, 1956, Serial No. 562,474

12 Claims. (Cl. 324—1)

This invention relates to magnetic devices and, more particularly, pertains to new and improved magnetic devices which are especially suitable as computing elements.

In computing operations, it is frequently necessary to derive a representation dependent upon the reciprocal of an independently variable quantity. Sometimes, the computations require the representation to be dependent on a power of the reciprocal. Although prior systems have been developed and used for such computing operations, many are very complex and costly.

It is an object of the present invention, therefore, to provide new and improved magnetic devices particularly suited to performing computing operations of the foregoing type.

Another object of the present invention is to provide new and improved magnetic devices which are relatively simple and inexpensive to construct and yet may be employed to obtain indications reliably representative of the reciprocal of a power of an independently variable quantity.

Yet another object of the present invention is to provide new and improved magnetic devices for obtaining the quotient of two independently variable quantities.

In accordance with the present invention, a magnetic device comprises a ferromagnetic core exhibiting a magnetization characteristic of magnetic flux versus magnetizing force including a portion for a range of values of magnetizing force having a continuously variable curvature. Input, control and output windings are disposed in inductive relation to the core and a source of alternating potential is coupled to the input winding for applying an alternating magnetic force to the core having a relatively small amplitude as compared to the aforesaid range. Means are provided for applying a unidirectional current of independently variable magnitude to the control winding to develop a magnetizing force of a value variable within the aforesaid range. The device further comprises means responsive to the amplitude of alternating potentials at the output winding thereby to derive indications dependent upon the reciprocal of a power of the magnitude of the current in the control winding.

According to a specific embodiment of the invention an alternating potential is applied to the input winding having an amplitude responsive to an independently variable quantity. Thus, indications are obtained which are representative of the ratio between that quantity and the aforesaid variable unidirectional current.

Also within contemplation of the present invention is the provision of an auxiliary control winding which may be energized so as to provide a desired operating characteristic for the magnetic device.

The novel features of the present invention are set forth with particularity in the appended claims. The present invention, both as to its organization and manner of operation, together with further objects and advantages thereof, may best be understood by reference to the following description taken in connection with the accompanying drawings in which:

Figure 1:
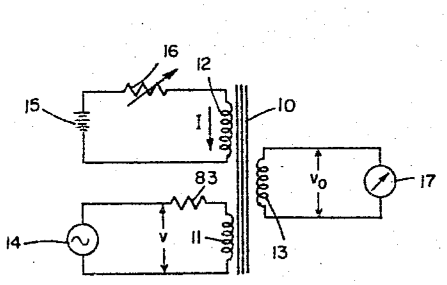
Fig. 1 is a schematic circuit diagram of a magnetic device embodying the present invention.

As shown in Fig. 1 of the drawings, a magnetic device constructed in accordance with the present invention comprises a ferromagnetic core 10 having a preselected magnetization characteristic to be described in greater detail hereinafter. Wound on core 10 are three coils including an input winding 11, a control winding 12 and an output winding 13. The coils 11—13 are thus disposed in inductive relation to core 10 and to one another.

A source of alternating potential 14 is coupled to input winding 11 via a resistor 83 of relatively high impedance, and a source of unidirectional current 15 is coupled to control winding 12 via an adjustable rheostat 16. Coupled to output winding 13 is an indicator 17 which, for example, may be a conventional voltmeter responsive to the amplitude of alternating potentials at winding 13.

In accordance with the present invention, ferromagnetic core 10 exhibits a magnetization characteristic of magnetic flux, B, versus magnetizing force, H, including a portion for a range of values of H having a continuously variable curvature and, in particular, may be described by one of the equations:

$$B=\frac{-C}{(n-1)H^{(n-1)}}+C' \qquad (1)$$

$$B=C\log_e H+C' \qquad (2)$$

where C and C′ in each of the Equations 1 and 2 are constants and *n* of Equation 1 is any constant having a value other than unity.

Beginning with the circuit in Figure 1 of the drawing, the magnetizing field H in the core 10 consists of two components:

$$H=H_0+H' \qquad \text{(i)}$$

where $H_0$ is the magnetizing force produced by the unidirectional current I in the control winding 12 and H′ is the magnetizing force produced by the varying current *i* in the input winding 11. The voltage $V_o$ induced in the output winding 13 is proportional to the rate of change of magnetic flux $\phi$ in the core 10:

$$V_o=-\frac{d\phi}{dt}=-A\frac{dB}{dt} \qquad \text{(ii)}$$

where A is the cross-sectional area of the core and B the magnetic flux density.

The relation between B and H is determined by the geometry and magnetic properties of the core 10. It has been found by experiment that, over a reasonably large range of H (the range is to be discussed presently), B can be accurately related to H by such Equations as 1 or 2. Assuming the logarithmic form of Equation 2 and substituting in (ii) above, it follows that:

$$V_o=-A\frac{dB}{dt}=-A\frac{d}{dt}(C\log_e H+C')=-\frac{AC}{H}\frac{dH}{dt} \qquad \text{(iii)}$$

From (i), since $H_0$ is constant in time, it follows that:

$$V_o=-\frac{AC}{H_0+H'}\frac{dH'}{dt} \qquad \text{(iv)}$$

It is apparent that the current through the winding 11 depends on the input voltage $v$ from the generator 14 and the values of the resistance 83 and the inductance of the winding 11. If R, the resistance of 83, is very much greater than $L\omega$, the inductive reactance of the winding 11, the current $i$ will be determined by R:

$$i \cong v/R \text{ for } R \gg L\omega \tag{v}$$

Since the input winding 11 has $N_{11}$ turns with a current $i$, the magnetizing field produced is:

$$H' = \frac{4\pi}{10} N_{11} i = \frac{4\pi N_{11} v}{10R} \tag{vi}$$

and $$\frac{dH'}{dt} = \frac{4\pi N_{11}}{10R} \frac{dv}{dt} \tag{vii}$$

so that $$V_o = -\frac{AC}{H_0 + H'} \frac{4\pi N_{11}}{10R} \frac{dv}{dt} \tag{viii}$$

Now assume that the generator 14 supplies a voltage $v = V \cos \omega t$, where V is the peak voltage:

$$\frac{dv}{dt} = \frac{d}{dt} V \cos \omega t = -V\omega \sin \omega t \tag{ix}$$

and that the D.C. field $H_0$ is $4\pi N_{12} I/10$ where $N_{12}$ and I are the number of turns and current in the coil 12, respectively. When these are substituted in Equation viii the result becomes:

$$V_o = \frac{AC}{4\pi N_{12} \frac{I}{10} + \frac{4\pi N_{11} \cdot V \cos \omega t}{10R}} \cdot \frac{4\pi N_{11}}{10R} \cdot V\omega \sin \omega t \tag{x}$$

rearranging:

$$V_o = \frac{AC 4\pi N_{11} V\omega \sin \omega t}{\frac{4\pi \cdot 10R}{10}\left(N_{12} I + \frac{N_{11} V \cos \omega t}{R}\right)} \tag{xi}$$

$$V_o = \frac{ACN_{11} V\omega \sin \omega t}{RN_{12} I + N_{11} V \cos \omega t} \tag{xii}$$

$$V_o = \frac{AC\omega \cdot N_{11} V \cdot \sin \omega t}{RN_{12} I\left(1 + \frac{N_{11} V}{RN_{12} I} \cos \omega t\right)} \tag{xiii}$$

assume:

$$k = \frac{N_{11}}{RN_{12}} \cdot \frac{V}{I}$$

and substitute in above:

$$V_o = \frac{AC\omega k \sin \omega t}{1 + k \cos \omega t} \tag{xiv}$$

$$V_o = C\omega Ak \frac{\sin \omega t}{1 + k \cos \omega t} \tag{xv}$$

For the R.M.S. of the output voltage to be linear in $k$, that is, $V_0$ directly proportional to $V/I$, it is necessary for $k$ to be less than unity. In fact, it can be readily shown by averaging $V_0^2$ over one cycle, that $$\text{R.M.S. output voltage} = \sqrt{\overline{V_o^2}} = \sqrt{\frac{2}{2}} \omega Ak(1 + \tfrac{3}{8} k^2 + \ldots) \tag{xvi}$$

with $$k = \left(\frac{N_{11}}{N_{12} R}\right) \frac{V}{I} < 1$$

or $$\frac{V}{I} < \frac{N_{12}}{N_{11}} R \tag{xvii}$$

The significance of Equations xvi and xvii above is that the R.M.S. output voltage will be directly proportional to $V/I$ with less than 1% deviation from linearity, provided the product of the turns ratio (turns in D.C. control winding 12/turns in input A.C. winding 11) and the resistance of resistor 83 in the input circuit is less than 0.15. This condition is satisfied readily in practice. Thus, it may be seen that the R.M.S. (or peak) output voltage is directly proportional to $V/I$ (input voltage divided by the control current) as set forth in Equation 3 hereinafter.

On the other hand, if the alternate relationship between B and H is assumed, see Equation 1, then instead of Equations iii and iv above we have:

$$V_o = -\frac{AC}{H^n} \frac{dH}{dt} = -\frac{AC}{(H_0 + H')^n} \frac{dH'}{dt} \tag{xviii}$$

Proceeding as before, it is readily shown that, instead of (xv) we have:

$$V_o = C\omega A \left(\frac{4\pi N_{12}}{10}\right)^{1-n} \frac{N_{11}}{N_{12} R} \frac{V}{I^n} \left[\frac{\sin \omega t}{(1 + k \cos \omega t)^n}\right] \tag{xix}$$

Taking the average of $V_0^2$ over one cycle yields:

$$\sqrt{\overline{V_o^2}} = \frac{C\omega AN_{11}}{N_{12} R} \frac{4\pi N_{12}^{1-n}}{10} \cdot \frac{V}{I^n} \left[1 + \frac{(2n-2)(2n-3)}{16} k^2 + \ldots\right] \tag{xx}$$

It should be noted that for certain values of $n$ the condition $k<1$ does not need to hold. For example, for the case $n=3/2$, the relation:

$$\sqrt{\overline{V_o^2}} \propto V/I^{3/2}$$

holds for any valve of $k$. This is a consequence of the fact that the function of time (expression in brackets, Equation xix) when squared and averaged over a cycle is a constant, independent of $k$. However, it should be understood that because the assumed B–H relation of Equation 1 may not be a precise fit in a particular case, it is desirable to keep $k<1$. Thus, if in part of the B–H curve $n$ is not 1.50, but is, say 1.60, the $\sqrt{\overline{V_o^2}} \propto (V/I)^{1.5}$ relation will be accurate to about 1% only when $k<0.8$. For this reason, it is desirable to keep $k$ small, even though in the neighborhood of $n=3/2$, 5/2, etc.

Preferably, core 10 should be constructed of a ferromagnetic material of low coercivity so that the magnetization characteristic has a B–H loop of minimum size. Furthermore, the core should exhibit a high initial incremental permeability, i.e., the curvature of the B–H curve should begin for low values of magnetizing force. The required characteristics may, for example, be obtained in soft iron or in an alloy of nickel, iron copper and chromium, commonly referred to as Mumetal. The core may be constructed in accordance with known techniques as to size and configuration. Thus, it may be a solid toroid or it may be laminated. Alternatively, it may be constructed like a transformer comprised of E-type laminations with each of the coils 11, 12 and 13 on a respective one of each of the three parallel legs.

Let it be assumed, for example, that the magnetic device of Fig. 1 is to be employed for obtaining the reciprocal of an independently variable quantity taken to the first power (unity). Thus, core 10 should exhibit a magnetization characteristic in accordance with Equation 2 for a given operating range. It is assumed that Equation 2 defines a portion of curve 18 in Fig. 2 which is a plot of magnetizing force versus resulting flux, in a range of values of magnetizing force between limits $H_1$ and $H_2$. The number of turns in winding 11 are selected in view of the voltage, V, supplied by source 14 to apply an alternating magnetic force to core 10 having a relatively small peak-to-peak amplitude as compared to the range from $H_1$ to $H_2$. For example, the amplitude may be a few percent of this range. Moreover, the number of turns in windings 12 is selected in view of the current capabilities of battery 15 so that variable resistor 16 may be used to control unidirectional current, I, in winding 12 to develop a magnetizing force variable within the range from $H_1$ to $H_2$. In addition, the number of turns in winding 13 is selected in view of the impedance and sensitivity characteristics of meter 17 so that indications of the output voltage, $V_o$, may be obtained.

Figure 2:
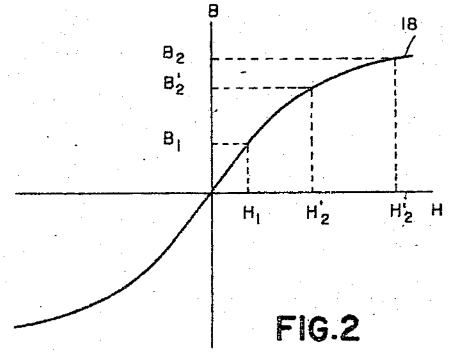
Fig. 2 represents an operating characteristic for a portion of the device illustrated in Fig. 1 and useful in explaining the operation of the device.

It is obvious from curve 18 in Fig. 2 that when rheostat 16 is adjusted so that the current in winding 12 produces a magnetizing force $H_1$, voltage $V_o$ will be a maximum. On the other hand when the current is adjusted to provide magnetizing force $H_2$, output voltage $V_o$ will be a minimum, while at intermediate values of magnetizing force, such as $H_2'$, the output voltage will have an intermediate value. It may be shown that when the usable portion of curve 18 is described by Equation 2 the indications of output $V_o$ obtained by indicators 17 are dependent upon the reciprocal of the magnitude of current I in control winding 12.

It is also apparent that if source 14 supplies a voltage V which may be independently varied, the magnetic device illustrated in Fig. 1 may be employed in the following computing operation:

$$V_o=\frac{V}{I} \quad (3)$$

In other words, the device may be used for obtaining the quotient of two independently variable quantities.

The range of accuracy will be dependent upon many factors such as the particular core which is used. For illustration purposes only, if a Mumetal core (Magnetics, Inc. No. 50036) is used, the inverse proportionality holds over a useful range of variation of the control current by a factor of 30:1. For example, the R.M.S. output voltage will be directly proportional to $V/I$ with less than 1% deviation for the condition when the product of the turns ratio of the two windings $$\left(\frac{N_{12}}{N_{11}}\right)$$

and the resistance of the resistor 83 is less than 0.15. This condition is achieved readily in practice.

If it is desired to obtain representations dependent upon a power of the reciprocal, where the power is different from a value of unity, core 10 should be constructed to exhibit a magnetization characteristic having a portion described by Equation 1 above. Of course, the required factor should be substituted for the quantity ($n$) in the equation. For example, if the power is to be one-half, from Equation 1:

$$n-1=\tfrac{1}{2} \quad (4)$$

or $$n=\tfrac{3}{2} \quad (5)$$

It will be noted that the magnetization curve may be brought to a desired shape by adding a magnetic flux leakage path, for example, one having a contoured air gap. By an appropriate choice of the geometry of the flux leakage path and its air gap for a given core material, the magnetization curve may be shaped so as to provide a desired curvature.

Furthermore, although battery 15 and rheostat 16 have been illustrated for supplying unidirectional current I, obviously any other arrangement may be employed. For example, a transducer providing unidirectional current of variable magnitude may be utilized.

From the foregoing discussion it is apparent that a magnetic device embodying the present invention is relatively simple and inexpensive to construct and yet may be reliably used in computing the reciprocal of a power of an independently variable quantity. In addition, such a device may be employed to derive the quotient or ratio of two independently variable quantities.

Figure 3:
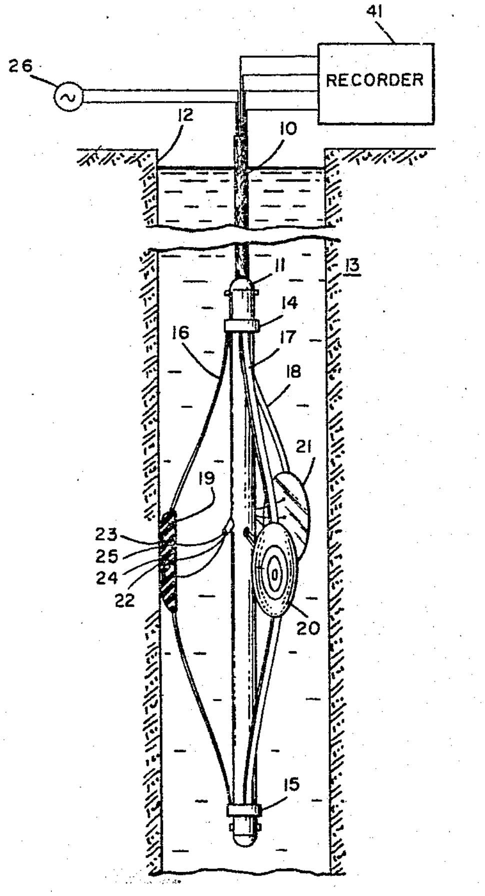
Fig. 3 is a view, partly in longitudinal cross section, of one form of well logging apparatus in which a magnetic device of the type represented in Fig. 1 may be incorporated.

Illustrated in Fig. 3 is apparatus for exploring a borehole drilled into the earth. This apparatus is of a type in which a magnetic device embodying the present invention may be conveniently incorporated.

An electric cable 10 supports a metallic carrier 11 in a borehole 12 which traverses earth formation 13. Slidably mounted on opposite ends of carrier 11 are a pair of collars 14 and 15 to which three bowed springs 16, 17 and 18 are secured. The springs 16, 17 and 18 are equally spaced about carrier 11 and each carries one of three wall-engaging pads 19, 20 and 21 intermediate its ends. These pads may be made of rubber or other flexible, electrically insulating material arranged to conform generally with the contour of the wall of the borehole 12.

In the outer face of each pad is formed a central circular recess 22 surrounded by a coaxial annular recess 23. Imbedded in recess 22 is a principal current emitting electrode 24 and an annular electrode 25 is imbedded in recess 23. This type of electrode configuration is illustrated in Patent No. 2,712,629 to H. G. Doll and the electrodes are appropriately energized so that a highly detailed log of the electrical resistivity of the earth formations may be obtained.

Although but a single electrode array has been described, it will be understood that each of pads 20 and 21 is likewise provided with a central current-emitting electrode and a surrounding electrode. Thus, the electrical resistivity of the formations may be measured at three laterally spaced positions in the borehole as disclosed in Patent No. 2,427,950 to H. G. Doll and this information may be used to determine the dip of strata traversed by the borehole.

Figure 4:
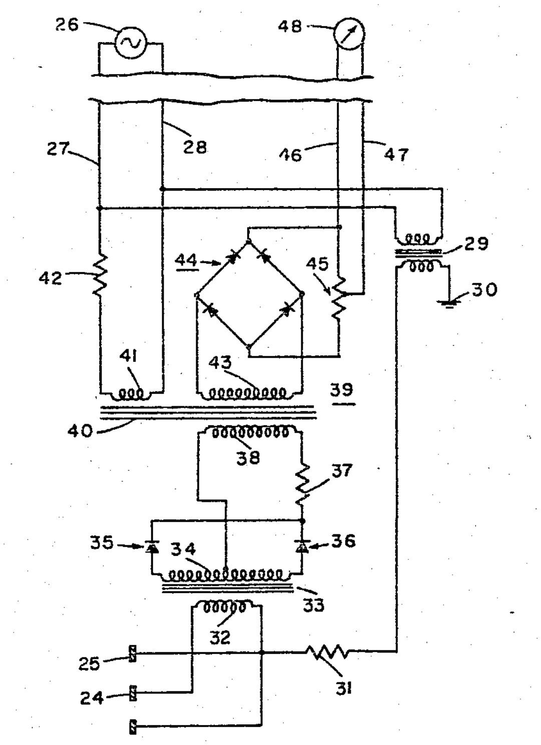
Fig. 4 is a schematic circuit diagram for a portion of the apparatus shown in Fig. 3.

As shown in Fig. 4, electrodes 24 and 25 may be energized by a source of alternating potential 26 located at the surface of the earth and connected by conductors 27 and 28 of cable 10 to the primary winding of an isolation transformer 29. One terminal of the secondary winding of transformer 29 may be grounded at point 30 which may be the body of carrier 11 and the other terminal is connected by a current-limiting resistor 31 to electrode 25. Electrode 25 is connected through the primary winding 32 of a coupling transformer 33 to central electrode 24. Preferably, winding 32 has a relatively low impedance and the transformer 33 has a secondary winding 34 in which the ratio of turns relative to primary winding 32 is high enough to develop an appreciable voltage. Secondary winding 34 is connected to a full-wave rectifier comprised of diodes 35 and 36 and rectified output is supplied via a resistor 37 to a control winding 38 of a magnetic device 39 provided with a ferromagnetic core 40 having a magnetization characteristic similar to that described in connection with core 10 shown in Fig. 1. The value of resistor 37 is selected to provide a time constant for the system permitting a desired speed of logging. Magnetic device 39 is also provided with an input winding 41 having one terminal connected to lead 28 and another terminal connected via a resistor 42 to lead 27. The value of resistor 42 is chosen so that the alternating current impedance of the circuit including winding 41 is maintained constant and, also, the value of the resistor 42 is greater than the inductive reactance of the winding 41. Thus, the current in winding 41 is proportional to the voltage supplied by source 26.

An output winding 43 of magnetic device 39 is coupled to a rectifier which may be in the form of a bridge 44. The rectifier, in turn, is connected to a voltage divider 45 coupled by leads 46 and 47 of cable 10 to an indicator 48 at the surface of the earth. Indicator 48 may conveniently be in the form of a recording galvanometer in which the recording medium is displaced in proportion to movement of carrier 11 through borehole 12. Although but a single circuit has been described, it will be understood that identical provisions are made for the electrodes in each of the other pads 20 and 21.

As carrier 11 is passed through borehole 12, current is emitted from the electrode array in each of the pads 19, 20 and 21 in such a manner so as to pass into the formations 13 as a narrow beam which is substantially perpendicular to the wall of borehole 12 for a short distance into the formation. The ratio between the voltage supplied by source 26 and the voltage derived between electrodes 24 and 25 is indicative of the electrical resistivity of the earth formations through which the current passes.

To obtain this ratio, magnetic device 39 operates in essentially the same manner described in connection with the magnetic device shown in Fig. 1. Thus, the alternating potential supplied to primary 32 of transformer 33 causes an alternating potential to be developed at secondary 34 and this in turn is translated into a unidirectional current by rectifiers 35 and 36 for application to control winding 38. In other words, the current through control winding 38 is dependent upon the alternating potential derived between electrodes 24 and 25. From the discussion of Fig. 1, it is evident that the voltage derived at output winding 43 is equal to the ratio of the voltage applied to winding 41 to the current in winding 38. Accordingly, the desired ratio appears as the amplitude of the voltage at secondary 43 and after rectification a corresponding unidirectional potential is supplied to indicator 48.

It is thus apparent that a highly detailed representation of the resistivity of the formations 13 is obtained at the location of each of the pads 19, 20 and 21 and three records or logs are thereby obtained. These curves clearly depict the boundaries of the earth formations and by measuring the longitudinal displacement among the curves at sections depicting a boundary, and using these data to perform certain known computations the dip of a formation may be determined.

Figure 5:
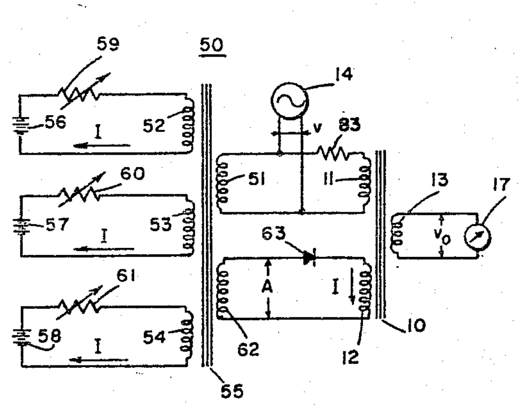
Figs. 5, 6, 7, 8 and 9 are circuit diagrams illustrating other embodiments of the present invention.

In Fig. 5 there is shown an arrangement in which a magnetic device embodying the present invention may be used in a computing function wherein addition or subtraction is accomplished.

The modified arrangement includes a transformer 50 having a primary winding 51 connected to source 14 of alternating potential and three control windings 52, 53 and 54. Transformer 50 has a core 55 whose magnetization characteristic is the same as described in connection with the arrangement of Fig. 1 and each of the control windings is associated with a respective one of unidirectional current sources represented by batteries 56, 57 and 58. In series with the batteries are respective rheostats 59, 60 and 61 and thus the currents $I_1$, $I_2$ and $I_3$ in the several control windings may be adjusted.

An output winding 62 of transformer 50 is connected via a rectifier 63 to a control winding 12 of another magnetic device having a ferromagnetic core 10 essentially identical to the one shown in Fig. 1. Also, the resistor 83 is greater than the inductive reactance of either of the windings 11 and 51. On core 10 is disposed an input winding 11 connected to source 14 and an output winding 13 connected to an indicator 17.

It is evident that the voltage, E, at point A in the circuit for output winding 62 of transformer 50 may be expressed as:

$$E=\frac{V}{I_1N_1\pm I_2N_2\pm I_3N_3} \qquad (6)$$

where $I_1$, $I_2$ and $I_3$ are the currents through the respective control windings, $N_1$, $N_2$ and $N_3$ are the numbers of turns in these windings, and the plus or minus signs are fixed by the polarity of the current flowing through the windings.

To obtain the sum (or difference) directly, the signal at point A is rectified by rectifier 63 and used to adjust the current I in control winding 12. Thus, a voltage $V_o$ registered by indicator 17 may be represented as:

$$V_o=I_1N_1+I_2N_2+I_3N_3 \qquad (7)$$

Of course, although only three control windings have been used for transformer 50, any desired number may be employed to obtain the sum of a corresponding number of terms.

Figure 6:
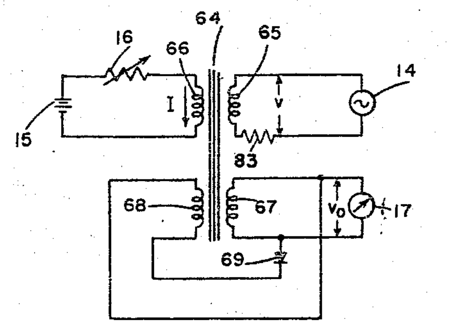

Another modification of the magnetic device embodying the present invention represented in Fig. 6 is provided with a ferromagnetic core 64 like the one described in connection with Fig. 1. In addition to an input winding 65, a control winding 66 and output winding 67, core 64 is provided with another control winding 68. Like the arrangement in Fig. 1, the resistor 83 is greater than the inductive reactance of the winding 65. A rectifier 69 is used to rectify the output at output winding 67 to derive a unidirectional current for application to the control winding 68. It is obvious that the operating equation for the device illustrated in Fig. 6 is:

$$V_o=\frac{K_1V}{I+K_2V_o} \qquad (8)$$

where $K_1$ and $K_2$ are constants which might be positive or negative. Expanding the above equation, it may be seen that $$V_o^2+\frac{IV_o}{K_2}-\frac{K_1}{K_2}V=0 \qquad (9)$$

This may be recognized as the quadratic equation in which the constants $K_1$ and $K_2$ are adjustable in magnitude and in sign. The voltage $V_o$ provides an indication of a solution of the quadratic equation.

Figure 7:
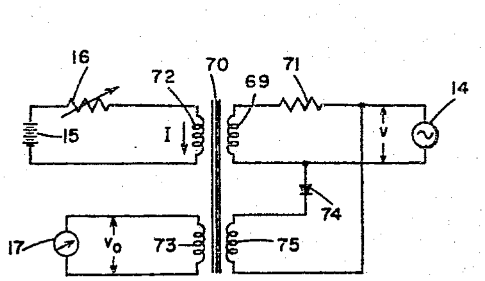

Another use of a magnetic device embodying the present invention is illustrated in Fig. 7. Here, alternating potential source 14 is connected to an input winding 69 on a ferromagnetic core 70 via an isolating resistor 71. The core 70 has a magnetization characteristic like that described in connection with core 10 of Fig. 1 and similarly is provided with a control winding 72 and an output winding 73. A rectifier 74 connects one terminal source 14 to one terminal of an auxiliary control winding 75 on core 70, and the remaining terminal of winding 75 is connected to the junction between the source 14 and resistor 71. Similarly as in Fig. 1, the resistor 71 is greater than the inductive reactance of the winding 69. It is apparent that the law of operation for the apparatus shown in Fig. 7 may be represented by the following:

$$V_o\sim\frac{V}{I\pm aV} \qquad (10)$$

where $a$ is an adjustable constant whose value may be determined by the amount of current flowing through winding 75. Multiplying the numerator and the denominator of the above equation by $$\left(\frac{1}{aI}\right)$$

the following relationship is obtained:

$$V_o\sim\frac{\frac{V}{aI}}{\frac{1}{a}+\frac{V}{I}} \qquad (11)$$

Since resistivity is proportional to the $V/I$ it will be seen that:

$$V_o\sim\frac{R}{R_{ms}+R} \qquad (12)$$

where $R_{ms}$ is the value of the resistivity which produces midscale deflection. Consequently, a device such as shown in Fig. 7 may be employed to produce a compressed scale for a resistivity logging device.

Figure 8:
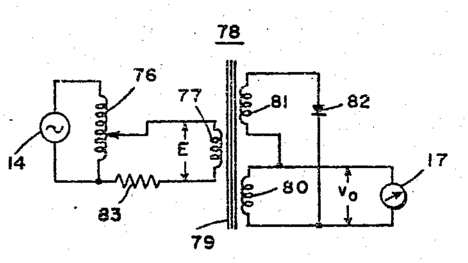

In Fig. 8 a magnetic device is shown in which a source of alternating potential 14 is coupled to an autotransformer 76 which supplies a voltage, E, to the primary or input winding 77 of a transformer 78. The resistor 83 here, similar to Fig. 1, is greater than the inductive reactance of the winding 77. This transformer has a core 79 whose magnetization characteristic is similar to that described in connection with core 10 in Fig. 1. An output winding 80 on the core is connected to an indicator 17 and also to a control winding 81 via a rectifier 82. Using an analysis similar to that employed in obtaining Equation 3, an expression for the operation of the arrangement of Fig. 8 may be shown as $$V_o=KE^{\left(\frac{1}{1+n}\right)} \qquad (13)$$

where K and $n$ are constants and E is the input voltage.

By appropriately choosing $n$, this form of magnetic device may be employed to obtain fractional powers of an independent variable.

Figure 9:
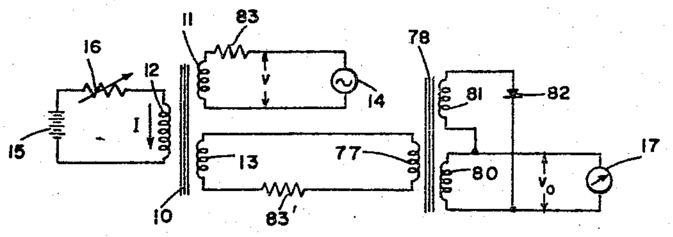

By combining the arrangements of Figs. 1 and 8 a reciprocal root taker may be derived as shown in Fig. 9. Thus, output winding 13 of core 10 is connected to input winding 77 of core 78. A resistor 83 and a resistor 83', similar to Fig. 1, are greater than the inductive reactance of the respective windings 11 and 13. If the cores 10 and 78 have the appropriate magnetization characteristics, the voltage, $V_o$, indicated at meter 17 may be expressed as:

$$V_o=\frac{(KV)^{1/2}}{I^{1/2}} \tag{15}$$

In the present practice of well logging in which electrical resistivity measurements are made in porous and permeable formations, it has been found that the porosity $\phi$ may be expressed as:

$$\phi=\left(\frac{aR_{mf}}{R_{xo}}\right)^{\frac{1}{m}} \tag{16}$$

where $a$ is a constant, usually taken as 0.62 and $m$ is approximately 2. In the above formula $R_{mf}$ is the resistivity of the mud filtrate and $R_{xo}$ is the resistivity of the flushed zone, i.e., the zone lying behind the borehole wall which is flushed of connate water by the penetration of mud filtrate. It is obvious that the arrangement illustrated in Fig. 9 may be employed for performing such computations.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

I claim:

1. A magnetic device comprising a ferromagnetic core exhibiting a magnetization characteristic of magnetic flux versus magnetizing force including a portion for a range of values of magnetizing force having a coninuously variable curvature, input, control and output windings disposed in inductive relation to said core, a source of alternating potential coupled to said input winding for applying an alternating magnetic force to said core having a relatively small amplitude as compared to said range, means for applying a unidirectional current of variable magnitude to said control winding to develop a magnetizing force variable within said range, a resistor in said input circuit such that the resistance is greater than the reactance of said input winding, and means responsive to the amplitude of alternating potentials at said output winding thereby to derive indications dependent upon the reciprocal of a power of the magnitude of the current in said control winding.

2. A magnetic device comprising a ferromagnetic core of relatively low coercivity exhibiting a magnetization characteristic of magnetic flux versus magnetizing force of high initial incremental permeability and including a portion for a range of values of magnetizing force having a continuously variable curvature, input, control and output windings disposed in inductive relation to said core, a source of alternating potential coupled to said input winding for applying an alternating magnetic force to said core having a relatively small amplitude as compared to said range, means for applying a unidirectional current of variable magnitude to said control winding to develop a magnetizing force variable within said range, a resistor in said input circuit such that the resistance is greater than the reactance of said input winding, and means responsive to the amplitude of alternating potentials at said output winding thereby to derive indications dependent upon the reciprocal of a power of the magnitude of the current in said control winding.

3. A magnetic device comprising a ferromagnetic core exhibiting a magnetization characteristic of magnetic flux versus magnetizing force including a portion for a range of values of magnetizing force having a continuously variable curvature, input, control and output windings disposed in inductive relation to said core, means for supplying an alternating potential to said input winding of independently variable amplitude to apply an alternating magnetic force of variable amplitude to said core having a relatively small maximum amplitude as compared to said range, means for applying a unidirectional current of independently variable magnitude to said control winding to develop a magnetizing force variable within said range, a resistor in said input circuit such that the resistance is greater than the reactance of said input winding, and means repsponsive to the amplitude of alternating potentials at said output winding thereby to derive indications dependent upon ratio between the amplitude of said alternating potential and a power of the magnitude of the current in said control winding.

4. A magnetic device comprising a ferromagnetic core exhibiting a magnetization characteristic of magnetic flux versus magnetizing force including a portion for a range of values of magnetizing force having a continuously variable curvature, input and output windings and principal and auxiliary control windings disposed in inductive relation to said core, a source of alternating potential coupled to said input winding for applying an alternating magnetic force to said core having a relatively small amplitude as compared to said range, means for applying a unidirectional current of variable magnitude to said principal control winding to develop a magnetizing force variable within said range, means for applying another unidirectional current to said auxiliary control winding, and means responsive to the amplitude of alternating potentials at said output winding thereby to derive indications dependent upon the reciprocal of a power of the magnitude of the current in said principal control winding and upon a function of the current in said auxiliary control winding.

5. A magnetic device comprising a ferromagnetic core exhibiting a magnetization characteristic of magnetic flux, B, versus magnetizing force, H, including a portion for a range of values of H described by one of the equations:

$$B=\frac{-C}{(n-1)H^{(n-1)}}+C' \tag{1}$$

and $$B=C\log_e H+C' \tag{2}$$

where C and C' in each of Equations 1 and 2 are constants and $n$ of Equation 1 is any constant having a value other than one, input, control and output windings disposed in inductive relation to said core, a source of alternating potential coupled to said input winding for applying an alternating magnetic force to said core having a relatively small amplitude as compared to said range, means for applying a unidirectional current of variable magnitude to said control winding to develop a magnetizing force variable within said range, and means responsive to the amplitude of alternating potentials at said output winding thereby to derive indications dependent upon the reciprocal of a power of the magnitude of the current in said control winding.

6. A magnetic device comprising a ferromagnetic core exhibiting a magnetization characteristic of magnetic flux, B, versus magnetizing force, H, including a portion for a range of values of H described by:

$$B=\frac{-C}{(n-1)H^{(n-1)}}+C'$$

where C and C' are constants and $n$ is any constant having a value other than one, input, control and output windings disposed in inductive relation to said core, a source of alternating potential coupled to said input winding for applying an alternating magnetic force to said core having a relatively small amplitude as compared to said range, means for applying a unidirectional current of variable magnitude to said control winding to develop a magnetizing force variable within said range, and means responsive to the amplitude of alternating potentials at said output winding thereby to derive indications dependent upon the reciprocal of a power of the magnitude of the current in said control winding.

7. A magnetic device comprising a ferromagnetic core exhibiting a magnetization characteristic of magnetic flux, B, versus magnetizing force, H, including a portion for a range of values of H described by:

$$B=C \log_e H+C'$$

where C and C′ are constants, input, control and output windings disposed in inductive relation to said core, a source of alternating potential coupled to said input winding for applying an alternating magnetic force to said core having a relatively small amplitude as compared to said range, means for applying a unidirectional current of variable magnitude to said control winding to develop a magnetizing force variable within said range, and means responsive to the amplitude of alternating potentials at said output winding thereby to derive indications dependent upon the reciprocal of the magnitude of the current in said control winding.

8. A magnetic device comprising a ferromagnetic core exhibiting a magnetization characteristic of magnetic flux, B, versus magnetizing force, H, including a portion for a range of values of H described by one of the equations:

$$B=\frac{-C}{(n-1)H^{(n-1)}}+C' \quad (1)$$

and $$B=C \log_e H+C' \quad (2)$$

where C and C′ in each of Equations 1 and 2 are constants and $n$ of Equation 1 is any constant having a value other than one, input and output windings and a plurality of control windings disposed in inductive relation to said core, a source of alternating potential coupled to said input winding for applying an alternating magnetic force to said core having a relatively small amplitude as compared to said range, means for applying individual unidirectional currents of variable magnitude to each of said control windings to develop corresponding magnetizing forces variable within said range, and means responsive to the amplitude of alternating potentials at said output winding thereby to derive indications dependent upon a predetermined function of the magnitudes of the currents in said control windings.

9. A magnetic device comprising a ferromagnetic core exhibiting a magnetization characteristic of magnetic flux, B, versus magnetizing force, H, including a portion for a range of values of H described by one of the equations:

$$B=\frac{-C}{(n-1)H^{(n-1)}}+C' \quad (1)$$

and $$B=C \log_e H+C' \quad (2)$$

where C and C′ in each of Equations 1 and 2 are constants and $n$ of Equation 1 is any constant having a value other than one, input and output windings and a plurality of control windings disposed in inductive relation to said core, a source of alternating potential coupled to said input winding for applying an alternating magnetic force to said core having a relatively small amplitude as compared to said range, means for applying individual unidirectional currents of independently variable magnitude to said control winding to develop corresponding magnetizing forces variable within said range, and means responsive to the amplitude of alternating potentials at said output winding thereby to derive indications dependent upon the reciprocal of the sum of a power of the magnitudes of the currents in said control windings.

10. A magnetic device comprising a ferromagnetic core exhibiting a magnetization characteristic of magnetic flux, B, versus magnetizing force, H, including a portion for a range of values of H described by one of the equations:

$$B=\frac{-C}{(n-1)H^{(n-1)}}+C' \quad (1)$$

and $$B=C \log_e H+C' \quad (2)$$

where C and C′ in each of Equations 1 and 2 are constants and $n$ of Equation 1 is any constant having a value other than one, input and output windings and principal and auxiliary control windings disposed in inductive relation to said core, a source of alternating potential coupled to said input winding for applying an alternating magnetic force to said core having a relatively small amplitude as compared to said range, means for applying a unidirectional current of independently variable magnitude to said principal control winding to develop a magnetizing force variable within said range, a coupling circuit extending between said output winding and said auxiliary control winding and including rectifying means for supplying a undirectional current to said auxiliary control winding to develop a magnetizing force variable within said range and having a magnitude dependent upon the amplitude of the alternating potential at said output winding, and means responsive to the amplitude of alternating potentials at said output winding thereby to derive indications dependent upon a preselected function of the magnitude of the current in said control winding.

11. An electrical logging system comprising a pair of electrodes adapted to be passed through a borehole, a source of alternating potential connected to one of said electrodes and to a reference point, a ferromagnetic core exhibiting a magnetization characteristic of magnetic flux, B, versus magnetizing force, H, including a portion for a range of values of H having a continuously variable curvature, input, control and output windings disposed in inductive relation to said core, means coupling said source of alternating potential to said input winding for applying an alternating magnetic force to said core having a relatively small amplitude as compared to said range, means for coupling said electrodes to said control winding including rectifying means for applying to said control winding a undirectional current of a magnitude dependent upon the amplitude of any alternating potential derived between said electrodes to develop a magnetizing force variable within said range, and means responsive to the amplitude of alternating potentials at said output winding thereby to derive indications dependent upon the ratio between the amplitudes of alternating potentials supplied by said source and derived between said electrodes.

12. An electrical logging system comprising a pair of electrodes adapted to be passed through a borehole, a source of alternating potential, means for coupling said source to one of said electrodes and to a reference point including an isolation transformer, a ferromagnetic core exhibiting a magnetization characteristic of magnetic flux, B, versus magnetizing force, H, including a portion for a range of values of H having a continuously variable curvature, input, control and output windings disposed in inductive relation to said core, means including a current-limiting impedance for coupling said source of alternating potential to said input winding for applying an alternating magnetic force to said core having a relatively small amplitude as compared to said range, another transformer having a primary winding of relatively low impedance connected between said electrodes and having a secondary winding, means for coupling said secondary winding of said other transformer to said control winding including rectifying means for applying to said control winding a undirectional current of a magnitude dependent upon the amplitude of any alternating potential derived between said electrodes to develop a magnetizing force variable within said range, and means responsive to the amplitude of alternating potentials at said output winding thereby to derive indications dependent upon the ratio between the amplitudes of alternating potentials supplied by said source and derived between said electrodes.

References Cited in the file of this patent

UNITED STATES PATENTS 1,535,037 Pungs ---------------- Apr. 21, 1925

OTHER REFERENCES

Radio Engineer's Handbook (Terman), 1943, page 91.